United States Patent Office 3,505,359
Patented Apr. 7, 1970

3,505,359
OXIDATION OF PROPYLENE
Charanjit Rai, John B. Braunwarth, and Robert C. Kimble, Crystal Lake, Ill., assignors, by mesne assignments, to Union Oil Company of California, Los Angeles, Calif., a corporation of California
No Drawing. Filed July 30, 1964, Ser. No. 386,445
Int. Cl. C07d 1/08
U.S. Cl. 260—348.5    18 Claims

ABSTRACT OF THE DISCLOSURE

The use of neodymium oxide as a catalyst for the liquid phase oxidation of olefins to oxygenated products including olefin oxides. The products are useful as monomers, solvents, intermediates for the preparation of surface active agents, etc.

---

This invention relates to a process for the oxidation of propylene. More particularly, this invention relates to a process for the oxidation of propylene to propylene oxide using a neodymium oxide catalyst at a temperature of about 250° to 400° F. with a ratio of hydrocarbon (total) to oxygen of at least about 10/1 and preferably 40/1 or higher and a pressure of about 500 to 700 p.s.i.g. Propylene oxide is used to prepare surfactants, monoethers, polyurethanes and glycols and for many other purposes known in the art.

It is known that the air oxidation of propylene in the liquid phase gives propylene oxide. To maintain liquid conditions at the temperatures necessary for the oxidation, the use of high pressures has been required because of the high vapor pressure of propylene. Inert organic liquid diluents have been required to dissolve the propylene, to reduce the pressures required to maintain a liquid phase containing propylene to be oxidized, and to distribute the heat of the reaction evenly so that localized overheating, due to the exothermic nature of the reaction, is avoided.

Furthermore, the oxidation is difficult to control and large amounts of the propylene are oxidized to acids through rupture of the double bond, some of the propylene oxide product polymerizes, some conversion to aldehydes occurs, some complete oxidation to carbon dioxide and water takes place, and some of the propylene oxide is hydrolyzed to propylene glycol by water formed during the oxidation reaction. In addition, it has been necessary to apply complex product separation procedures to isolate propylene oxide from the various by-products since attempts to render the oxidation more selective by using different catalysts and catalyst combinations have not met with success.

In accordance with this invention, the primary objective is to provide a novel procedure for the liquid phase oxidation of propylene preferentially to propylene oxide.

It is a further object of this invention to provide a process for the preparation of propylene oxide by the oxidation of propylene in the presence of neodymium oxide.

These and other objects and advantages are realized in accordance with this invention, wherein propylene is oxidized in the liquid phase with air under controlled conditions with neodymium oxide as the catalyst. In order to control the oxidation and gain the greatest advantages of this invention, the process is operated at a pressure of about 500 to 700 p.s.i.g., using propylene-to-inert-diluent ratios of about 1/1, oxygen flow rates of about 0.02 to 1.0 cu. ft. per hour per gram mole of propylene, and temperatures of about 350° to 375° F., the total contact time being about ¼ to 1 hour and preferably ¼ to ½ hour in a static system or large excesses of hydrocarbon, i.e. total hydrocarbon to oxygen ratios of at least 10/1 to 50/1 or higher for a continuous system. In carrying out the process, the neodymium oxide catalyst is easily recovered from the reaction products and is readily regenerated for reuse.

In order to demonstrate the invention, a series of experiments was conducted in an attempt to duplicate results reported in the prior art which appeared to be most favorable, and to further investigate the effectiveness of various catalytic materials reported in the prior art in comparison with some materials not disclosed as having any catalytic affect on the reaction.

Using manganese propionate as a catalyst in benzene, in accordance with the prior art, it is shown that at 750 p.s.i.g. and 350°–435° F. a stream of oxygen, propylene, propane in 1:1:1 ratio gave 28.5% propylene oxide, 6–12% propylene glycol and 10% $C_1$ to $C_4$ acids. In an attempt to duplicate this word, a 110 cc. stainless steel autoclave was charged with benzene and manganese propionate. On sealing and cooling to −75° F., the reactor was evacuated to 0.15 mm. pressure and propylene and propane were added. The reactor was then installed in a rocker, pressurized with air and heated to operating temperature.

On completion of the run, the reactor was cooled and the gaseous products and products remaining in the reactor were collected. Gaseous products were analyzed by mass-spectrometry and the liquid products by infrared. Quantities of reactants, reaction conditions and products found are given in Table I.

TABLE I.—OXIDATIONS OF PROPYLENE USING MANGANESE PROPIONATE CATALYST
[Weight of catalyst, 0.2 g.]

|  | Reactants charged | | | Reaction conditions | | | |
|---|---|---|---|---|---|---|---|
| Run No. | Propylene, g. | Propane, g. | Benzene, g. | Temp., °F. | Initial pressure, p.s.i. | Time, hr. | Reaction products (mole percent yield based on propylene charged) |
| 1 | 6.0 | 5.0 | 20 | 360 | 650 | | 10 Esters and acids. |
| 2 | 6.0 | 5.0 | 20 | 360 | 450 | | 5 Aldehydes and methyl ketones. |
| 3 | 7.8 | 5.8 | 20 | 375 | 320 | | 1¾ Aldehydes and ketones. |
| 4 | 15.0 | 3.0 | 10 | 375 | 650 | | 8 Aldehydes (25), propylene oxide (trace), propylene glycol (2). |
| 5 | 9.8 | 2.5 | 10 | 325 | 610 | | 8 Aldehydes (<5%). |
| 6 | 10.5 | 2.8 | 10 | 275 | 580 | | 8 Acids. |
| 7 | 15.2 | 5.8 | 10 | 425 | 580 | | 8 Ketones, aldehydes, acids, esters, propanediol (trace). |
| Prior art conditions | 333 | 333 | 620 | 347–437 | 750 | | |

As seen from the results in Table I only trace amounts of propylene oxide (0.5%) and 2 mole percent of propylene glycol were detected.

Other prior art workers have reported several prior art catalysts as having little effect on oxide formation. Medius and Ingold, Canadian Journal of Chemical Engineering, 42, 86–87 (1964) have found that finely divided silver did not catalyze epoxidation of propylene in contrast to earlier reports, i.e., United States Patent 2,985,668. Brill and Barone, Reprints, General Papers, Div. of Petrol.

Chem. A.C.S., 8 #1, 27 (1963) and also some of the instant inventors' work have confirmed this. Brill and coworker used benzene as the solvent and conducted the epoxidation with oxygen at 250° F. and 400 to 600 p.s.i.g. By using methyl ethyl ketone peroxide as the catalyst, Brill and Barone obtained 8.2% propylene oxide and 22.1% propylene glycol ester derivatives, based on propylene converted.

Studies on propylene epoxidation using in separate runs such epoxide catalysts as methyl ethyl ketone peroxide, cyclohexanone peroxide, cumene hydroperoxide, and azobisisobutyronitrite at 250° F., 600 p.s.i., with a propylene to benzene volume ratio of 50–50, 1.0 g. as catalyst weight and an oxygen flow rate of 0.1 cu. ft./1 hour in a 300 cc. stirred autoclave, were made. Although this was not a flow system, yields as high as 19 mole percent, based on unrecovered propylene, using cyclohexanone peroxide, were obtained.

The use of a peroxide catalyst has the disadvantage of being expensive, the catalyst loses its activity quickly and the catalyst cannot be economically recovered for reuse.

Next a series of runs was made using neodymium oxide, ceric oxide, lanthanum oxide, and boric acid as the catalyst. In these runs, a 300 cc. stainless steel stirred autoclave equipped with an electric heater, was used. The reactor was charged with benzene (122 g.) and the catalyst (1.0 g.) to be tested. Propylene (approximately 66 g.) was charged by sealing the reactor, cooling it to −80° F., evacuating it to 0.25 mm. pressure and allowing propylene to enter. The charged reactor was then installed in the oxygen flow system.

The oxygen was obtained from a commercial pressurized cylinder. It was passed through a calibrated Jerguson rotameter and a 200–1000 p.s.i.g. reducing Grove Regulator into the bottom of the reactor. The Grove Regulator was set 100 p.s.i.g. higher than the desired operating pressure. The gaseous materials exited from the top of the reactor. The exit line had a back pressure Grove Regulator, a Dry Ice trap, and a wet-test meter, in that order, installed in the system. The reactor was heated to 50° F. and stirring was begun. After stirring several minutes, the stirring system was lubricated and the packing adjusted. Oxygen was then fed into the reactor at approximately 1 cu. ft. per hour until 300 p.s.i. gauge pressure was reached. Heating was continued until the operating temperature was reached. Reactor temperature was controlled by an automatic Guardsman using a thermocouple.

At operating temperature, a small addition of oxygen was necessary to bring the system to operating pressure, 600 p.s.i. The oxygen flow (0.1 cu. ft. per hour) was then begun and continued during the length of the run. The reactor stirrer had to be continuously operated to minimize leakage through the stirrer shaft.

On the exit side of the oxidation unit, a 200–1000 p.s.i.g. back pressure Grove Regulator was used to maintain the desired reaction pressure. Exit gas flow rate was measured by a wet test meter. Off gas products were collected in a Dry Ice-acetone trap.

On completion of the run, the reactor was rapidly cooled to room temperature and depressurized. The off-gases were passed through a Dry Ice-acetone cold trap, where unreacted propylene was collected, and then were collected in a large tank by displacement of water. A sample of this material was presented for mass-spectrometry analysis.

The crude propylene in the cold trap was evaporated and the residue submitted for infrared analysis. The reactor contents were weighed and also submitted for infrared analysis.

The results are shown in Table II.

TABLE II.—NOVEL PROPYLENE OXIDATION CATALYSTS

Reaction conditions: Temperature,[1] 250° F.
Pressure, 600 p.s.i.g.
Propylene to benzene volume ratio 50–50
Weight of catalyst, 1.0 g.
Oxygen flow rate, 0.1 cu. ft./hr.

| Run No. | Catalyst | Length of run, hr. | Yield of propylene oxide, g. | Yield based on propylene charged, mole percent | Yield based on unrecovered propylene,[2] mole percent |
|---|---|---|---|---|---|
| 8 | Neodymium oxide | ½ | None | | |
| 9 | do | 1 | 2.43 | 3.2 | 17 |
| 10 | do | 3 | Trace | | |
| 11 | Ceric oxide | 4 | Trace | | |
| 12 | Lanthanum oxide | 4 | Trace | | |

[1] In Run 9 the temperature ranged between 250° and 300° F.
[2] Unrecovered propylene means propylene reacted as well as lost during the test run because of leakage.

These results show that certain catalysts are effective in producing at least trace amounts of propylene oxide. It was observed that neodymium oxide, Run #9, was a particularly good catalyst in a one hour run. Accordingly, neodymium oxide was studied in further detail using the procedure outlined for Runs 8 to 14 (Table II). These results are shown in Table III.

TABLE III.—STUDY OF NEODYMIUM OXIDE AS A CATALYST

Reaction conditions: Pressure, 600 p.s.i.g.
Propylene to benzene volume ratio 50–50
Weight of neodymium oxide, 1.0 g.
Oxygen flow rate 0.1 cu. ft./hr.

| Run No. | °F. | Run, hr. | Yield of propylene oxide, g. | Yield based on propylene charged, mole percent | Yield based on unrecovered propylene,[1] mole percent |
|---|---|---|---|---|---|
| 15 | 300 | 1 | 3.17 | 3.4 | 12 |
| 16 | 300 | 2 | 4.52 | 5.0 | 21 |
| 17 | 300 | 3 | 5.20 | 5.5 | 17 |
| 18 | 300 | 4 | Trace | | |
| 19[2] | 350 | ½ | 6.28 | 6.6 | 27 |
| 20 | 350 | 1 | 4.77 | 5.0 | 22 |
| 21 | 350–375 | ½ | 3.05 | 3.3 | 17 |
| 22 | 350–375 | 2 | 4.61 | 5.1 | 15 |
| 23[3] | 350 | ½ | 1.80 | 1.9 | 34 |
| 24[4] | 350 | ½ | [5]1.7 | 1.7 | |

[1] Unrecovered propylene means propylene reacted and lost during the run.
[2] Oxygen flow 0.2 cu. ft./hr.
[3] Neodymium oxide catalyst from previous runs was reused.
[4] Pressure 650 p.s.i.g.
[5] Vol. percent.

From these results, it is apparent that by increasing the oxidation temperature to 350° F. and reducing the time of oxidation to ½ hour, a yield of 27 mole percent of propylene oxide was obtained, based on unrecovered propylene. Leakage in the stirring shaft of the reactor made it necessary to report the yields in this fashion. However, even so, the yield based on propylene charged was 6.6%. Furthermore, it is apparent from Run 23 that the catalyst does not degrade during the oxidation. The yield of oxide was reduced but the yield based on unrecovered propylene increased sharply.

The advantages of the use of neodymium oxide as a catalyst are realized by using this oxide alone or on an inert support such as $Al_2O_3$, $SiO_2$, pumice and the like, provided the temperature is maintained at about 250° to 400° F., the hydrocarbon/$O_2$ mole ratio is at least about 10/1 and the pressure is superatmospheric. Best results are obtained at a temperature of about 350° to 375° F., using a reaction time of at least ⅙ hour and preferably about ¼ to 1 hour, and a pressure of about 500 to 700 p.s.i.g. and preferably 600 p.s.i.g. Optimum results are obtained under these conditions in about ½ hour. These conditions being present, an economical yield of propylene oxide is assured. The liquid volume ratio of diluent/olefin, e.g., benzene/propylene or naphthalene/propylene, may vary from 60–40 parts by volume of diluent to 40–60 parts by volume of olefin and preferably is about 50/50. In batch reactor systems, between about 0.1 to 5.0 g. of neodymium oxide per 300 cc. capacity of the reactor may be used, while in flow reactor systems 0.1 to 5.0 parts by weight of catalyst per 65 parts by weight of olefin may be used. The rate of oxygen entry into the reactor preferably is adequate to maintain a 10–1 to 50/1 hydrocarbon/$O_2$ mole ratio.

The starting material for the reaction of this invention is preferably propylene, although propylene-propane mixtures can be used, or other mixtures where the added ingredient, as propane, acts as an inert gas which can be recovered from the effluent gas stream. When using mixtures of propylene and propane, minor amounts of propane may be converted to propylene oxide. Other saturated hydrocarbons may be present but offer no advantages to the reaction. Other unsaturated hydrocarbons are not desirable since they are oxidized and must be separated from the products if pure propylene oxide is desired. Other diluents such as water-insoluble solvents including cyclohexane, hexane, or heptane may be used and other solvents or materials inert to the oxidation may be used. Benzene is the superior diluent.

The products of the reaction are propylene oxide, propylene glycol, acetic acid, formic acid, methyl formate, alcohols of the $C_1$ to $C_3$ variety and often a heavy acid fraction in minor quantities, plus oxides of carbon and water. The principal product is propylene oxide which is generally about 60–70% by weight of the oxidized products. The other oxidized products produced can be separated to add to the economies of the operation. The process can be operated continuously, semi-continuously or batchwise. Under continuous conditions at temperatures of 350–400° F. using total hydrocarbon (propylene+benzene) ratios of 3/1 the reaction is difficult to control. However, by conducting the process on a continuous basis the advantages of using neodymium oxide catalyst are still attained as long as the temperature is about 250° to 400° F., the pressure is superatmospheric and the ratio of hydrocarbon (total) to $O_2$ is at least about 10/1 to 50/1 or higher. This avoids excessive pressure build-up in a continuous basis. In a continuous operation, the propylene oxide can be continuously removed from the effluent and the heavier fractions recycled to the reactor, while propylene glycol, acetic acid and any formic acid are also recovered continuously and then separated continuously or batch-wise. The process of this invention is characterized by the reduction of temperature and/or pressure and time over the prior art processes. Since some acids are present in the products, it is advisable to use corrosion-resistant equipment, e.g., 316 stainless steel or glass-lined steel reactors.

The embodiments of this invention in which an exclusive property or privilege is claimed are defined as follows:

1. The process of oxidizing propylene-containing gaseous hydrocarbon mixtures to useful oxidized products including propylene oxide, acetic acid, formic acid, methyl formate and $C_1$ to $C_3$ alcohols which comprises contacting molecular oxygen and said propylene-containing gas at a temperature of about 250° to 400° F. using a hydrocarbon/$O_2$ ratio of at least 10/1 and superatmospheric pressure from about 500 to about 700 p.s.i.g. in the presence of a catalytic amount of neodymium oxide and for a reaction period of at least about ⅙ hour, sufficient to form propylene oxide in said oxidized products.

2. The process in accordance with claim 1 in which said neodymium oxide is the sole catalytic material present during the reaction.

3. The process in accordance with claim 1 in which said neodymium oxide is mixed with an inert support material.

4. The process in accordance with claim 3 in which said support material is a member of the group consisting of alumina, silica, pumice and mixtures thereof.

5. The process in accordance with claim 1 in which the temperature is about 300° F. and the reaction time is at least about ⅙ hour.

6. The process in accordance with claim 1 in which the temperature is about 350° to 375° F., the reaction time is about ¼ to 1 hour and the pressure is about 500 to 700 p.s.i.g.

7. The process in accordance with claim 1 in which the reaction time is about ¼ to ½ hour and the pressure is about 600 p.s.i.g.

8. The process in accordance with claim 1 in which said propylene-containing mixture comprises inert diluent and propylene in a volume ratio of about 60–40 parts by volume of diluent to about 40–60 parts by volume of propylene and about 0.1 to 5.0 parts by weight of neodymium oxide per 65 parts by weight of propylene is present in said mixture.

9. The process in accordance with claim 8 in which said propylene-containing mixture comprises about 69.5 parts by weight of propylene and about 122 parts by weight of benzene as said inert diluent and the oxygen-containing gas is supplied at a rate sufficient to maintain a hydrocarbon/$O_2$ mole ratio of 10/1 to 50/1 in said reaction.

10. The process of producing propylene oxide which comprises reacting propylene with oxygen at a hydrocarbon/$O_2$ mole ratio of at least 10/1 at a temperature of about 250° to 400° F. and superatmospheric pressure from about 500 to about 700 p.s.i.g. in the presence of a catalytic amount of neodymium oxide and for a period of at least ⅙ hour, sufficient to form said propylene oxide.

11. The process in accordance with claim 10 in which said neodymium oxide is the sole catalytic material present during the reaction.

12. The process in accordance with claim 10 in which said neodymium oxide is mixed with an inert support material.

13. The process in accordance with claim 12 in which said support material is a member of the group consisting of alumina, silica, pumice and mixtures thereof.

14. The process in accordance with claim 10 in which the temperature is about 300° F. and the reaction time is at least about ⅙ hour.

15. The process in accordance with claim 10 in which the temperature is about 350° to 375° F., the reaction time is about ¼ to 1 hour and the pressure is about 500 to 700 p.s.i.g.

16. The process in accordance with claim 10 in which the reaction time is about ¼ to ½ hour and the pressure is about 600 p.s.i.g.

17. The process in accordance with claim 10 in which said propylene is mixed with an inert diluent in a volume ratio of about 60–40 parts by volume of diluent to 40–60 parts by volume of propylene and about 0.1 to 5.0 parts by weight of neodymium oxide per 65 parts by weight of propylene is present in said reaction mixture.

18. The process in accordance with claim 17 in which a mixture of about 69.5 parts by weight of propylene and about 122 parts by weight of benzene is used and the oxygen is supplied at a rate sufficient to maintain a hydrocarbon/$O_2$ mole ratio of 10/1 to 50/1 in said reaction mixture.

References Cited

UNITED STATES PATENTS

| | | | |
|---|---|---|---|
| 2,780,634 | 2/1957 | Robertson | 260—348.5 |
| 3,071,601 | 1/1963 | Aries | 260—348.5 |

NORMA S. MILESTONE, Primary Examiner

U.S. Cl. X.R.

260—497, 533, 632